(12) United States Patent
Rahmes et al.

(10) Patent No.: US 12,190,525 B2
(45) Date of Patent: Jan. 7, 2025

(54) SYSTEMS AND METHODS OF AVIATION DATA COMMUNICATION ANOMALY DETECTION, AS IN AIR TRAFFIC CONTROL SURVEILLANCE SYSTEMS

(71) Applicant: L3Harris Technologies, Inc., Melbourne, FL (US)

(72) Inventors: Mark Rahmes, Melbourne, FL (US); Jennifer Spicer, Westminster, MD (US); Robert Konczynski, Melbourne, FL (US); Kusay Rukieh, Seffner, FL (US); Jody Flieder, West Melbourne, FL (US); Dustin Ellsworth, Fredonia, KY (US); Michael Fischer, Indialantic, FL (US); Timothy Bruce Faulkner, Palm Bay, FL (US)

(73) Assignee: L3Harris Technologies, Inc., Melbourne, FL (US)

( * ) Notice: Subject to any disclaimer, the term of this patent is extended or adjusted under 35 U.S.C. 154(b) by 417 days.

(21) Appl. No.: 17/552,074

(22) Filed: Dec. 15, 2021

(65) Prior Publication Data

US 2023/0186482 A1   Jun. 15, 2023

(51) Int. Cl.
*G06V 10/26* (2022.01)
*G06T 7/13* (2017.01)
(Continued)

(52) U.S. Cl.
CPC .............. *G06T 7/13* (2017.01); *G06V 10/26* (2022.01); *G06V 10/457* (2022.01);
(Continued)

(58) Field of Classification Search
CPC ............ G06T 7/13; G06T 2207/10028; G06V 10/26; G06V 10/457; G06V 10/462;
(Continued)

(56) References Cited

U.S. PATENT DOCUMENTS 10,181,185 B2   1/2019   Park et al.
10,373,056 B1   8/2019   Andoni et al.
(Continued)

OTHER PUBLICATIONS

"An Anomaly Detection Model for ADS-B Systems Using a LSTM-based Variational Autoencoder." 2021 IEEE 3rd International Conference on Civil Aviation Safety and Information Technology (ICCASIT). IEEE, 2021 (Year: 2021).*
(Continued)

*Primary Examiner* — Amandeep Saini
*Assistant Examiner* — Denise G Alfonso
(74) *Attorney, Agent, or Firm* — Kane Kessler, P.C.; Barry E. Negrin

(57) ABSTRACT

Systems and methods for detecting anomalies in aviation data communication systems (e.g., air traffic control surveillance systems), include a processor receiving device status information. A variational autoencoder receives and optimizes the device status information and determines whether it qualifies as an anomaly. Optimized device status information is compared to either non-anomalous or anomalous device status data in a latent space of the variational autoencoder. The latent space preferably includes an n-D point scatter plot and hidden vector values. The processor optimizes the device status information by generating a plurality of probabilistic models of the device status information and determining which of the plurality of models is optimal. A game theoretic optimization is applied to the plurality of models, and the best model is used to generate the n-D point scatter plot in latent space. An image gradient sobel edge detector preprocesses the device status information prior to optimization.

30 Claims, 8 Drawing Sheets

(51) Int. Cl.
　　　*G06V 10/44*　　　(2022.01)
　　　*G06V 10/46*　　　(2022.01)
　　　*G08G 5/00*　　　(2006.01)

(52) U.S. Cl.
　　　CPC .......... *G06V 10/462* (2022.01); *G06V 10/476* (2022.01); *G08G 5/0004* (2013.01); *G08G 5/0073* (2013.01); *G06T 2207/10028* (2013.01)

(58) Field of Classification Search
　　　CPC ...... G06V 10/476; G06V 10/44; G06V 10/82; G08G 5/0004; G08G 5/0073; G08G 5/0026
　　　See application file for complete search history.

(56) References Cited

U.S. PATENT DOCUMENTS

| | | | |
|---|---|---|---|
| 10,410,113 | B2 | 9/2019 | Clayton et al. |
| 10,528,533 | B2 | 1/2020 | Saini et al. |
| 10,593,033 | B2 | 3/2020 | Niculescu-Mizil et al. |
| 10,600,009 | B1 | 3/2020 | Augustine et al. |
| 10,616,257 | B1 | 4/2020 | Soulhi et al. |
| 10,665,251 | B1 | 5/2020 | Wood, III et al. |
| 10,679,129 | B2 | 6/2020 | Baker |
| 10,733,722 | B2 | 8/2020 | Niculescu-Mizil et al. |
| 10,743,809 | B1 | 8/2020 | Kamousi et al. |
| 10,789,703 | B2 | 9/2020 | Lu et al. |
| 10,812,523 | B2 | 10/2020 | Latapie et al. |
| 10,817,394 | B2 | 10/2020 | Oba |
| 10,839,320 | B2 | 11/2020 | Augustine et al. |
| 10,848,508 | B2 | 11/2020 | Chen et al. |
| 10,860,928 | B2 | 12/2020 | Mnih et al. |
| 10,872,209 | B2 | 12/2020 | Ha et al. |
| 10,909,419 | B2 | 2/2021 | Itou et al. |
| 10,909,671 | B2 | 2/2021 | Kimura et al. |
| 10,931,700 | B2 | 2/2021 | Soulhi et al. |
| 10,964,011 | B2 | 3/2021 | Cosatto et al. |
| 10,970,395 | B1 | 4/2021 | Bansal et al. |
| 2020/0183047 | A1 | 6/2020 | Denli et al. |
| 2020/0193418 | A1 | 6/2020 | Augustine et al. |
| 2020/0342362 | A1 | 10/2020 | Soni et al. |
| 2021/0065070 | A1 | 3/2021 | Augustine et al. |
| 2023/0085991 | A1* | 3/2023 | Liebman ............ G05B 23/0259 700/79 |

OTHER PUBLICATIONS

Memarzadeh, Milad, Bryan Matthews, and Ilya Avrekh. "Unsupervised anomaly detection in flight data using convolutional variational auto-encoder." Aerospace 7.8 (2020): 115 (Year: 2020).*

Liao, Weixian, et al. "Multidimensional time series anomaly detection: A gru-based gaussian mixture variational autoencoder approach." Asian Conference on Machine Learning. PMLR, 2018. (Year: 2018).*

Zhou, Bingxin, Xuebin Zheng, and Junbin Gao. "On the trend-corrected variant of adaptive stochastic optimization methods." 2020 international joint conference on neural networks (ijcnn). IEEE, 2020. (Year: 2020).*

Balduzzi, David. "Grammars for games: a gradient-based, game-theoretic framework for optimization in deep learning." Frontiers in Robotics and AI 2 (2016): 39. (Year: 2016).*

Thavasimani, Karthikayini, and N. K. Srinath. "Deep learning techniques: A case study on comparative analysis of various optimizers to detect bots from CRESCI-2017 dataset." International Journal of Advanced Science and Technology 29.04 (2020): 10040-10053. (Year: 2020).*

Riba, Edgar, et al. "A survey on kornia: an open source differentiable computer vision library for pytorch." arXiv preprint arXiv: 2009.10521 (2020). (Year: 2020).*

Liu, Guan-Horng, Tianrong Chen, and Evangelos Theodorou. "Dynamic game theoretic neural optimizer." International Conference on Machine Learning. PMLR, 2021. (Year: 2021).*

Wan, Zhiqiang, Yazhou Zhang, and Haibo He. "Variational autoencoder based synthetic data generation for imbalanced learning." 2017 IEEE symposium series on computational intelligence (SSCI). IEEE, 2017. (Year: 2017).*

Biswas, Gautam, et al. "An approach to mode and anomaly detection with spacecraft telemetry data." International Journal of Prognostics and Health Management 7.4 (2016). (Year: 2016).*

Amini, et al., "Variational Autoencoder for End-to-End Control of Autonomous Driving With Novelty Detection and Training De-Biasing", pp. 568-575, 2018 IEEE/RSJ International Conference on Intelligent Robots and Systems (IROS); Madrid, Spain, Oct. 1-5, 2018.

An, et al., "Variational Autoencoder Based Anomaly Detection Using Reconstruction Probability", SNU Data Mining Center, Feb. 2015 Special Lecture on IE, Dec. 27, 2015.

T Chen, et al., "Unsupervised Anomaly Detection of Industrial Robots Using Sliding-Window Convolutional Variational Autoencoder", pp. 47072-47081, Digital Object Identifier 10.1109/ACCESS.2020. 2977892, Mar. 17, 2020.

Daudt, et al., "Urban Change Detection for Multispectral Earth Observation Using Convolutional Neural Networks", pp. 2115-2118, 978-1-5386-7150-4/18/$31.00 © 2018 IEEE, IGARSS 2018.

Fan, et al., "Video Anomaly Detection and Localization Via Gaussian Mixture Fully Convolutional Variation Autoencoder", pp. 1-12.

Maoguo Gong, Xudong Niu, Tao Zhan, and Mingyang Zhang (2019) A coupling translation network for change detection in heterogeneous images, International Journal of Remote Sensing, 40:9, 3647-3672, DOI: 10.1080/01431161.2018.1547934.

Norlander, et al., "Latent Space Conditioning for Improved Classification and Anomaly Detection", pp. 1-18, Lund University, Dec. 2, 2019, ar.Xiv:1911.10599v2 [cs.LG] Nov. 28, 2019.

Kawachi et al., "Complementary Set Variational Autoencoder for Supervised Anomaly Detection", pp. 2366-2370, NTT Media Intelligence Laboratories, Tokyo, Japan, 978-1-5386-4658-8/18/$31.00 © 2018 IEEE, ICASSP 2018.

Klingma et al., "Auto-Encoding Variational Bayes", pp. 1-14, ar.Xiv:1312.6114v10 [stat.ML] May 1, 2014.

Li et al., "Traffic Identification of Mobile Apps Based on Variational Autoencoder Network" , pp. 287-291, 0-7695-6341-4/17/31.00 © 2017 IEEE DOI 10.1109/CIS.2017.00069.

Memarzadeh, et al., "Unsupervised Anomaly Detection in Flight Data Using Convolutional Variational Auto-Encoder", pp. 1-19, Aug. 8, 2020; Aerospace 2020, 7, 115; doi: 10.3390/aerospace7080115, www.mdpi.com/journal/aerospace.

Nguyen, et al., "GEE: A Gradient-Based Explainable Variational Autoencoder for Network Anomaly Detection".

Sun, et al., "Learning Sparse Representation With Variational Auto-Encoder for Anomaly Detection", pp. 33353-33361, special section on novel learning applications and services for smart campus, IEEE Access, vol. 6, 2018.

Wang, et al., "Diverse and Accurate Image Description Using a Variational Auto-Encoder With an Additive Gaussian Encoding Space", pp. 1-11, 31st Conference on Neural Information Processing Systems (NIPS 2017), Long Beach, CA, USA.

Wiewel, et al., "Continual Learning for Anomaly Detection With Variational Autoencoder", Institute of Signal Processing and System Theory, University of Stuttgart, Germany, pp. 3837-3841, 978-1-5386-4658-8/18/$31.00 © 2019 IEEE, ICASSP 2019.

Xu, et al. Towards Effective Instrusion Detection Using LOG-COSH Conditional Variational Autoencoder, , pp. 1-10, DOI 10.1109/IIOT.2020.3034621, IEEE Internet of Things Journal.

Yan, et al., "Abnormal Event Detection From Videos Using a Two-Stream Recurrent Variational Autoencoder", pp. 30-42, IEEE Transactions on Cognitive and Developmental Systems, vol. 12, No. 1, Mar. 2020.

Yao, et al., "Unsupervised Anomaly Detection Using Variational Auto-Encoder Based Feature Extraction", 2019 IEEE International Conference on Prognostics and Health Management (ICPHM), 978-1-5386-8357-6/19/$31.00 © 2019 IEEE.

Zavrak, et al., "Anomaly-Based Intrusion Detection From Network Flow Features Using Variational Autoencoder" , vol. 8, 2020, pp. 108346-108358, DOI 10.1109/ACCESS 2020.3001350.

(56) References Cited

OTHER PUBLICATIONS

Zerrouki, et al., "Desertification Detection Using an Improved Variational Autoencoder-Based Approach Through ETM-Landsat Satellite Data", pp. 1-13, IEEE Journal of Selected Topics in Applied Earth Observations and Remote Sensing, DOI 10.1109/JSTARS 2020.3042760.

Zimmerer et al., "Context-Encoding Variational Autoencoder for Unsupervised Anomaly Detection", pp. 1-13, Division of Medical Image Computing, German Cancer Research Center (DKFZ), Heidelberg, Germany, ar.XIV:1812.05941v1 [cs.LG] Dec. 14, 2018.

* cited by examiner

SYSTEMS AND METHODS OF AVIATION DATA COMMUNICATION ANOMALY DETECTION, AS IN AIR TRAFFIC CONTROL SURVEILLANCE SYSTEMS

BACKGROUND OF THE INVENTION

Field of the Invention

The invention is directed to aviation data communication anomaly detection. More specifically, the invention is directed to systems and methods for efficiently and effectively monitoring air traffic control surveillance systems, such as Automatic Dependent Surveillance-Contract (ADS-C) and Automatic Dependent Surveillance-Broadcast (ADS-B) systems for anomalies by means of a variational autoencoder.

Description of Related Art

ADS-C is a two-way system that provides comprehensive information critical to flight safety, especially as air travel becomes increasingly crowded. ADS-C is a contract between the aircraft and air traffic control (ATC) for regular position reporting. The two-way methodology agreed by the International Civil Aviation Organization transmits position reports of the aircraft on an agreed specified time period, typically between 10 and 14 minutes, but moving to shorter intervals of 3.2 minutes to reduce separation standards in the future. Positioning is just one of the elements of safe air traffic control. In addition, aircraft must be equipped with communications capabilities that can provide a controller-to-pilot datalink service and voice communications.

As shown in FIG. 8A, an ADS-C system 200 includes two-way communication among flight management system 204 on aircraft 202, communication network 206 (including space-based satellites 206A and ground-based devices 206B), and ATC 208. A typical ADS-C message transmits the following information: the identification code of aircraft 202; its position (altitude, latitude, longitude) and time; speed, heading, and rate of climb/descent; the next waypoint with estimated altitude and time, and the waypoint after that (next+1) with estimated altitude and time; weather information; and other information such as additional information about an aircraft's navigational intent.

Space-based ADS-B is a simpler, one-way broadcast. As shown in FIG. 8B, ADS-B system 250 includes only one-way communication via the transmitter 254 and antenna 253 of aircraft to communication network 256 (including space-based satellites 256A and ground-based devices 256B) and thence to ATC 258. A typical ADS-B message transmits the following information: the identification code of aircraft 252; its position (altitude, latitude, longitude); its velocity; and sometimes other information.

An anomaly in the aviation data communications dataset would represent any unusual combination of this data. Some examples might include:
- an aircraft reporting a location not consistent with which ground station it is in contact with (e.g., aircraft reports it is over Alaska but in contact with a ground station in Guam);
- an unusual/erroneous latitude or longitude;
- an unusual bearing for this location on this flight path;
- unusual arrival airport for the given lat/lon/altitude (e.g., flying very low over NY but neither departure nor arrival are NY).

It would be advantageous to find all such anomalous data, including cases that ATC may not think to look for directly.

Accordingly, there is a long felt need to provide a way of determining when an out of the ordinary occurrence in an aviation data communication environment is a sufficiently significant incident to warrant a response.

There is another long felt need to provide a way of discovering multiple different types events in an aviation data communication environment within a single tool or suite of tools.

SUMMARY OF THE INVENTION

The above and other objects are fulfilled by the invention, which includes aviation data communication anomaly detection systems and methods and non-transitory computer-readable storage media including one or more programs for executing a model of detecting aviation data communication anomalies. The invention utilizes artificial intelligence and machine learning (AI/ML) to distinguish those cases which require investigation from other events not requiring further investigation. By significantly reducing the false positives using an AI/ML engine, an analyst can focus on investigating the events related to an incident rather than ignoring those incidents. Additionally, the risks and repercussions of a cyber incident will be drastically reduced if an incident is detected and addressed early.

In an embodiment, the invention includes an aviation data communication anomaly detection system. A plurality of interconnected aviation data communication devices are provided, and at least a portion of the plurality of the devices generating device status information. A processor is in communication with at least one of the devices of the portion of the plurality of the devices and receiving the device status information. The processor operates a variational autoencoder that receives the device status information; optimizes the received device status information; and determines or enables a user to determine whether the device status information qualifies as an anomaly that requires a response. The processor compares the optimized device status information to at least one of non-anomalous device status data or anomalous device status data in a latent space of the variational autoencoder.

In an embodiment, the latent space includes an n-D point scatter plot, and the further the optimized device status information is from the non-anomalous device status data in the latent space, the greater the likelihood the device status information represents an anomaly. In an embodiment, the latent space includes a 3-D point scatter plot that includes hidden vector values.

In an embodiment, the processor optimizes the device status information by generating a plurality of probabilistic models of the device status information and determining which of the plurality of models is optimal. In an embodiment, the processor determines which of the plurality of models is optimal by applying a game theoretic optimization to the plurality of models and selecting which of the plurality of models to use to generate the n-D point scatter plot in latent space. In an embodiment, the plurality of models includes at least two of Adam, a replacement optimization algorithm for stochastic gradient descent for training deep learning models, stochastic gradient descent with momentum (SGDM), or root mean square propagation (RMSProp).

In an embodiment, the invention includes a display; and a user interface, the user interface enabling a user to select a data sample from the device status information and to see where the data sample is located in the latent space n-D point scatter plot.

In an embodiment, the processor further includes an image gradient sobel edge detector that preprocesses the device status information prior to optimizing the device status information. In an embodiment, the image gradient sobel edge detector is configured to return a floating point edge metric.

In an embodiment of the inventive system, the plurality of interconnected aviation data communication devices includes an air traffic control surveillance system.

The invention also includes a method of detecting aviation data communication anomalies in a plurality of interconnected aviation data communication devices. The method includes the steps of generating device status information for at least a portion of the plurality of interconnected aviation data communication devices; receiving the device status information at a processor in communication with at least one of the devices of the portion of the plurality of devices; and operating a variational autoencoder on the processor that is configured for receiving the device status information; optimizing the received device status information; and determining or enabling a user to determine whether the device status information qualifies as an anomaly that requires a response. In an embodiment, the method further includes the step of comparing, via the processor, the optimized device status information to at least one of non-anomalous device status data or anomalous device status data in a latent space of the variational autoencoder.

In an embodiment, the latent space includes an n-D point scatter plot; the further the optimized device status information is from the non-anomalous device status data in the latent space, the greater the likelihood the device status information represents an anomaly. In an embodiment, the latent space includes a 3-D point scatter plot that includes hidden vector values.

In an embodiment, the optimizing step further includes the steps of: generating, via the processor, a plurality of probabilistic models of the device status information; and determining, via the processor, which of the plurality of models is optimal. In an embodiment, the step of determining which of the plurality of models is optimal further includes the steps of: applying a game theoretic optimization to the plurality of models; and selecting which of the plurality of models to use to generate the n-D point scatter plot in latent space. The optimizing step is performed for at least one subset of the device status information.

In an embodiment, the method further includes the step of preprocessing the device status information prior to optimizing the device status information via an image gradient sobel edge detector. In an embodiment, the image gradient sobel edge detector returns a floating point edge metric.

In an embodiment, the method further includes the steps of implementing a 3-D p-value statistical test to measure anomaly detection accuracy, and representing the results of the 3-D p-value statistical test with Receiver Operating Characteristic (ROC) curves. The implementing step, in an embodiment, further includes the steps of: selecting a 3-D view of latent space clusters that shows the most separation of test hypotheses; and calculating the probability of the most likely non-anomalous device status data to which received device status information might belong to latent space distribution.

In an embodiment of the inventive method, the plurality of interconnected aviation data communication devices includes an air traffic control surveillance system.

The invention also includes a non-transitory computer-readable storage medium, including one or more programs for executing a model of detecting aviation data communication anomalies in a plurality of interconnected aviation data communication devices by use of a variational autoencoder. The model is configured to: receive device status information from at least a portion of the plurality of interconnected aviation data communication devices; optimize the received device status information by use of the variational autoencoder; and determine or enable a user to determine whether the device status information qualifies as an anomaly that requires a response. In an embodiment, the model is further configured to compare, via the processor, the optimized device status information to at least one of non-anomalous device status data or anomalous device status data in a latent space of the variational autoencoder. In an embodiment, the latent space includes an n-D point scatter plot, and wherein the further the optimized device status information is from the non-anomalous device status data in the latent space, the greater the likelihood the device status information represents an anomaly. In an embodiment, the latent space includes a 3-D point scatter plot that includes hidden vector values.

In an embodiment, the model is further configured to optimize, via the processor, the device status information by generating a plurality of probabilistic models of the device status information and determines which of the plurality of models is optimal. In an embodiment, the model is further configured to determine, via the processor, which of the plurality of models is optimal by applying a game theoretic optimization to the plurality of models and selecting which of the plurality of models to use to generate the n-D point scatter plot in latent space.

In an embodiment, the model is further configured to preprocess the device status information prior to optimizing the device status information via an image gradient sobel edge detector. In an embodiment, the model is further configured to return a floating point edge metric via the image gradient sobel edge detector.

In an embodiment, the model is further configured to: implement a 3-D p-value statistical test to measure anomaly detection accuracy; and represent the results of the 3-D p-value statistical test with ROC curves. In an embodiment, the model is further configured to: select a 3-D view of latent space clusters that shows the most separation of test hypotheses; and calculate the probability of the most likely non-anomalous device status data to which received device status information might belong to latent space distribution.

In an embodiment, the plurality of interconnected aviation data communication devices includes an air traffic control surveillance system.

DETAILED DESCRIPTION OF THE INVENTION AND DRAWINGS

Description will now be given with reference to the attached FIGS. 1-8. It should be understood that these figures are exemplary in nature and in no way serve to limit the scope of the invention, which is defined by the claims appearing hereinbelow.

One of the key elements of the invention is a variational autoencoder (VAE). VAEs, like other autoencoders, include an encoder, a decoder, and latent space. In a typical autoencoder, the encoder learns to compress (reduce) the input data into an encoded representation, the decoder learns to reconstruct the original data from the encoded representation to be as close to the original input as possible, and the latent space is the layer that contains the compressed representation of the input data.

VAEs differ from regular autoencoders in that they do not use the encoding-decoding process simply to reconstruct an input. Instead, they impose a probability distribution on the latent space, and learn the distribution so that the distribution of outputs from the decoder matches that of the observed data. Then, they sample from this distribution to generate new data. A VAE assumes that the source data has some sort of underlying probability distribution (such as Gaussian) and then attempts to find the parameters of the distribution. A variational autoencoder is a generative system and serves a similar purpose as a generative adversarial network. One main use of a variational autoencoder is to generate new data that is related to the original source data. In the case of the instant invention, the new data is used for additional training and testing analysis.

Figure 1:
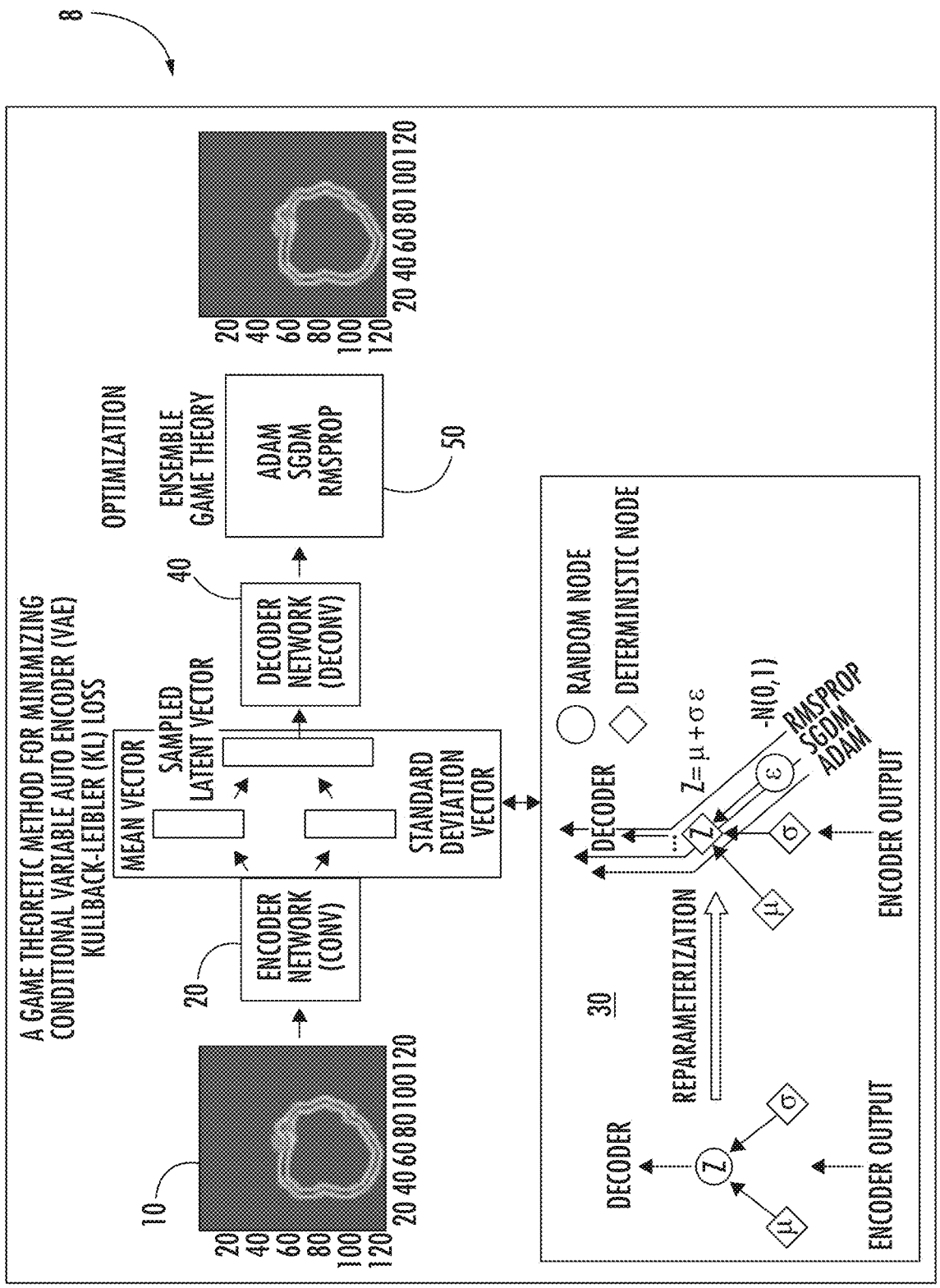
FIG. 1 is a system diagram of a variational autoencoder with game theory optimization in accordance with an embodiment of the invention.

FIG. 1 depicts a typical process flow 8 of an embodiment of the invention. The goal of the system is ultimately to detect or enable a user to detect anomalous behavior within an aviation data communication system such as an air traffic control ATC surveillance system like ADS-C or ADS-B. This can take the form of a device malfunction, a cyberattack, signal interference, off-course aircraft, and the like.

At step 10, data is input into the system. The data in this case can represent any aspect or aspects of the system or devices under test, including but not limited to overall performance, individual device performance, performance of a plurality of devices clustered together, parameters such as latitude, longitude, altitude, and more as discussed below (see Table 1).

In an embodiment, at step 10, an image gradient sobel edge detector is used as a preprocessing step. This preprocessing step helps the models to learn more quickly and with more accuracy. In an embodiment, the image gradient sobel edge detector is configured to return a floating-point edge metric.

At step 20, the preprocessed data is provided to the encoder of the VAE. The VAE forces input data onto a multidimensional Gaussian distribution. In an embodiment, the system preferably utilizes a 20-dimensional distribution, although other distributions can also be utilized. The system learns the means and variances of the data (20 means and variances in the previously mentioned embodiment), and the resulting distribution describes the data.

The encoder generates a compressed representation of the input data. This representation is called the hidden vector. The mean and variance from the hidden vector are sampled and learned by the convolutional neural network (CNN). Principal component analysis (PCA) of the hidden vector allows for the visualization of n-D point clusters, preferably 3-D point clusters, in the latent space. To make calculations more numerically stable, the range of possible values is increased by making the network learn from the logarithm of the variances. Two vectors are defined: one for the means, and one for the logarithm of the variances. Then, these two vectors are used to create the distribution from which to sample.

In step 30, reparameterization is used to handle sampling of the hidden vector during backpropagation (an algorithm for training neural networks). An ensemble of models are generated using three different solvers: Adam, SGDM, and RMSProp. The values from the loss function (evidence lower bound or ELBO, reconstruction, and Kullback-Leibler or KL loss, to be discussed below) can be used in a game theoretic implementation to determine the optimal model to use per test sample. The loss is used to compute the gradients of the solvers.

There are several aspects to step 30:

Custom Training Loop—Both networks (mean and variance hidden vectors) are trained with a custom training loop, and automatic differentiation is enabled;

Function Model—The function model, Gradients, takes in the encoder and decoder objects and a mini-batch of input data and returns the gradients of the loss with respect to the learnable parameters in the networks;

Sampling & Loss—The function performs this process in two steps: sampling and loss. The sampling step samples the mean and the variance vectors to create the final encoding to be passed to the decoder network;

Reparameterization—Because backpropagation through a random sampling operation is not possible, it is necessary to use the reparameterization trick. This moves the random sampling operation to an auxiliary variable, which is then shifted by the mean and scaled by the standard deviation.

The loss function has the following attributes:

Loss Step—passes the encoding generated by the sampling step through the decoder network and determines the loss, which is then used to compute the gradients. The loss in VAEs, also called the evidence lower bound (ELBO) loss, is defined as a sum of two separate loss terms: reconstruction loss+KL loss.

Reconstruction Loss—measures how close the decoder output is to the original input by using the mean-squared error (MSE).

Kullback-Leibler (KL) Divergence—measures the difference between two probability distributions. Minimizing the KL loss in this case means ensuring that the learned means and variances are as close as possible to those of the target (normal) distribution.

Practical Effect—The practical effect of including the KL loss term is to pack clusters learned due to reconstruction loss tightly around the center of the latent space, forming a continuous space from which to sample.

In step 40 onward, the decoder process generates synthetic output data. The system uses an ensemble of solvers with game theoretic implementation to create an output image with least image reconstruction error (to be described in more detail below). In step 50, as above on the encoder side, the system generates an ensemble of models using three different solvers: Adam, SGDM, and RMSProp. Game theory is used to select the optimal solution from the ensemble. The values from the loss function (ELBO, Reconstruction, and KL loss) can be used in a game theoretic implementation to determine the optimal model to use per test sample. The loss is used to compute the gradients of the solvers.

Optimization utilizes a linear program to optimally choose which deep learning model to use per data point. A reward matrix, A, is created with data image loss values for different solvers. An M×C reward matrix is constructed where M is the number of models in the ensemble (typically three) and C is the number of loss inputs (KL, ELBO, and reconstruction loss). One model is used for each solver, for a total of three models: Adam; SGDM; and RMSProp. The matrix is solved for each image. A goodness-of-fit metric is used, f(x), from the reconstruction and KL loss scores or responses. An objective function, b, is used which minimizes the cost loss function per image. An interior-point algorithm, i.e., the primal-dual method, is used, which must be feasible for convergence. The Primal Standard form used to calculate optimal solver is:

$$\text{minimize } f(x) \, s.t. \quad (1)$$

$$Ax \leq b \quad (2)$$

$$x \geq 0 \quad (3)$$

In an embodiment, the three types of loss are put in a table having three columns and three rows. The rows correspond to the solvers Adam, SGDM, and RMSprop; as such, the rows reflect the decision to be made. The columns are the parameters that are input, resulting in the reward matrix mentioned above. The reward matrix is fit into a linear program, and boundary conditions are set. When the linear program is run, the result informs which row has the least error. That row corresponds to one of the solvers. Thus, on a per sample basis, the solver is selected with the lowest loss or error.

Figure 2:
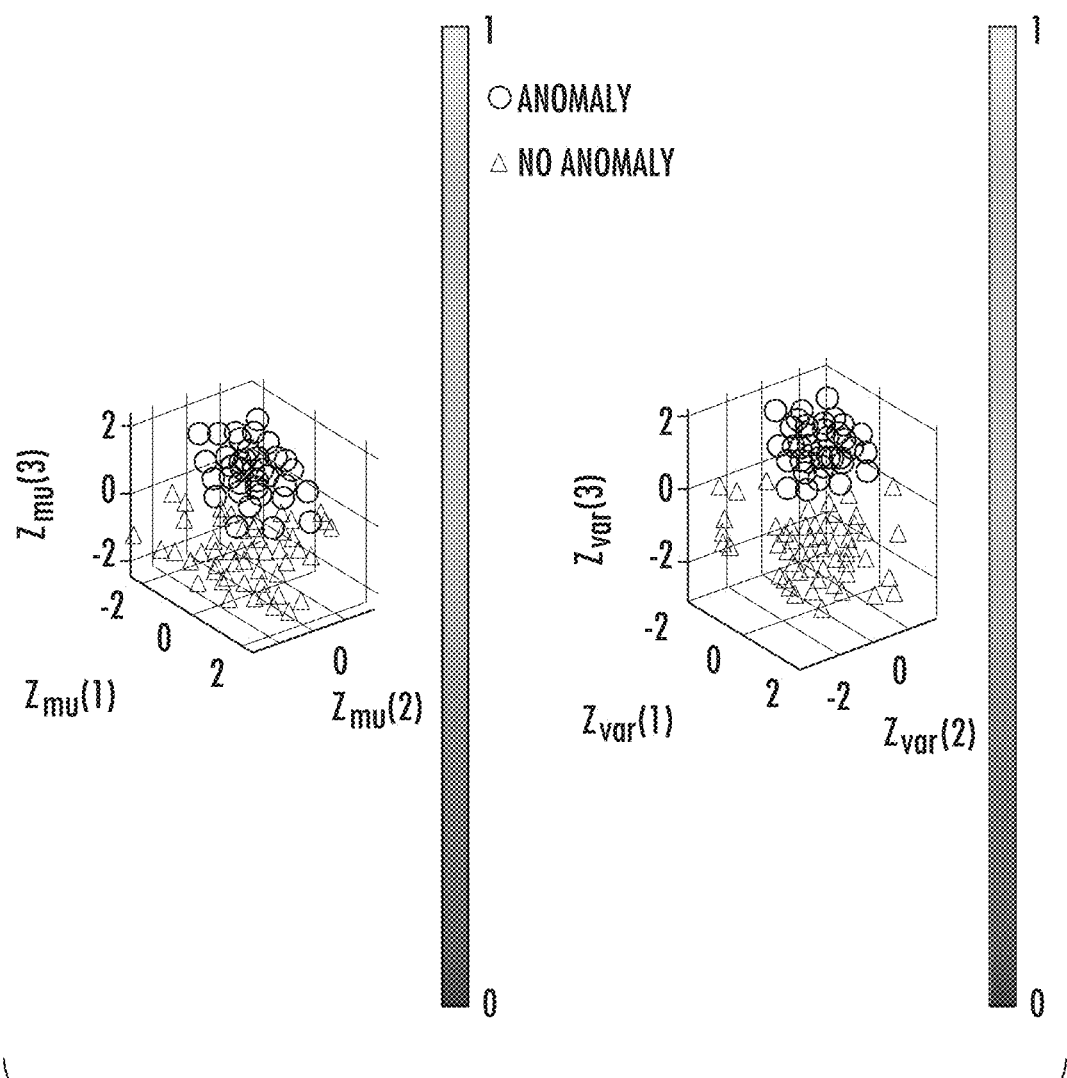
FIG. 2 is a 3-D scatter plot of the mean and variance latent space hidden vectors in accordance with an embodiment of the invention.
Figure 3:
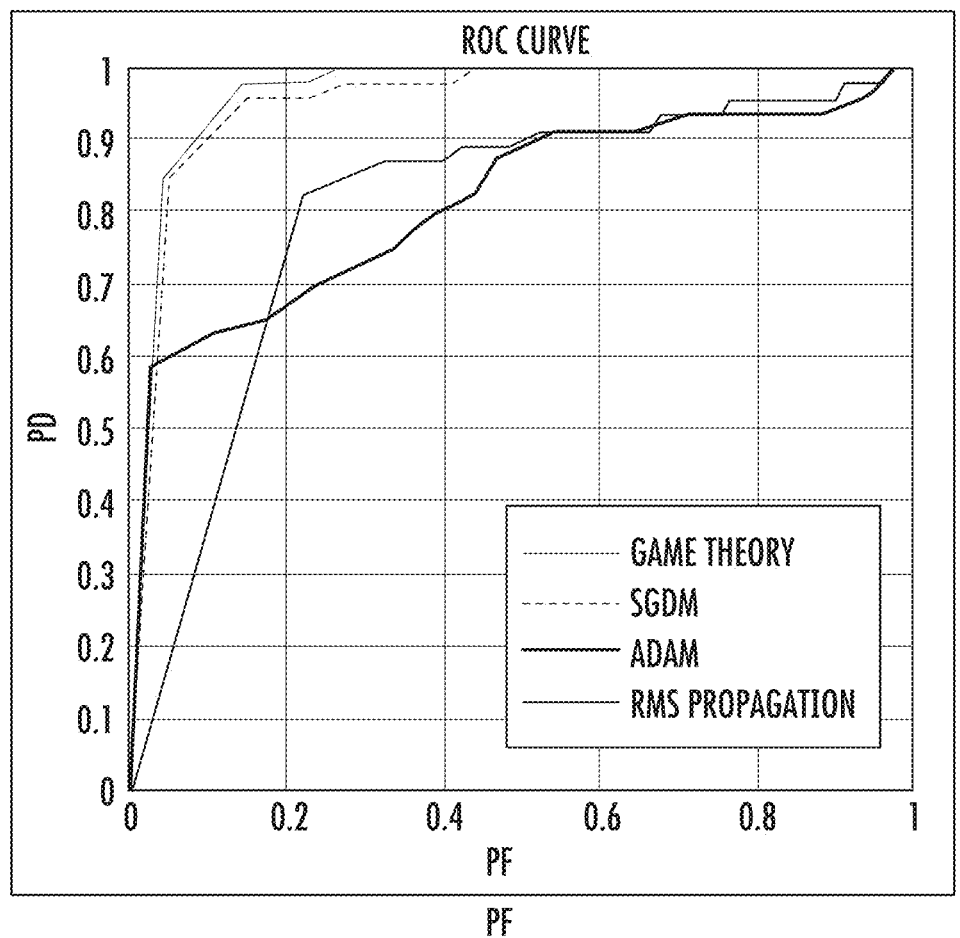
FIG. 3 is an ensemble of ROC curves in accordance with an embodiment of the invention.
Figure 4:
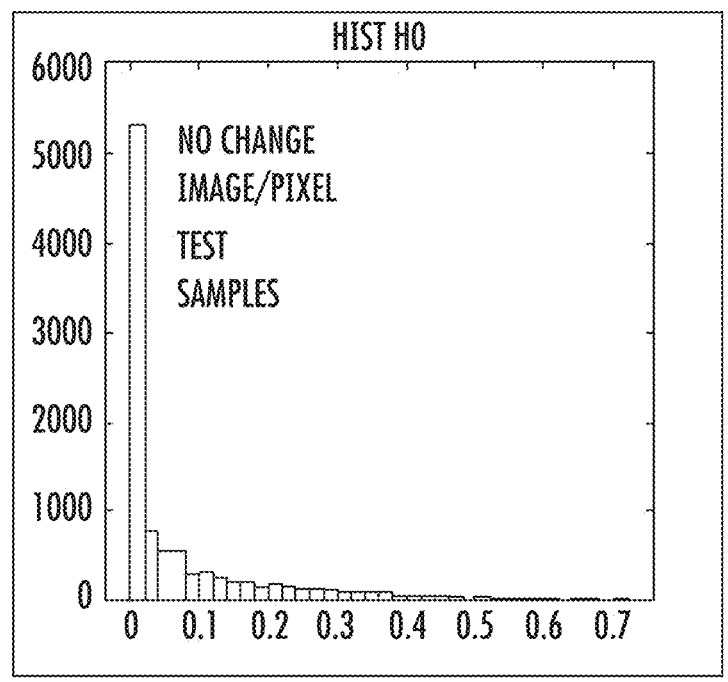
FIG. 4 is a graph of H0, no change image/pixel test samples, in accordance with an embodiment of the invention.

FIG. 2 depicts the abovementioned 3-D point scatter plots of the mean and variance hidden vectors.

It is beneficial to determine the accuracy of the output of the decoder. The invention includes accuracy assessment techniques known herein as the Z test. In it, the P test is used to determine the probability that a new test sample belongs to any one normal categorical set of data. The normal category could include an antenna channel, network security characteristics, data communication characteristics, or the like. If the likelihood of a new test sample belonging to the normal set of conditions is low, then the test sample is declared abnormal. The P test value of latent space three-dimensional point clusters, shown in FIG. 2, is then used as the metric to calculate Receiver Operating Characteristic (ROC) curves, shown in FIG. 3, consisting of confusion matrices of true and false positive and negative classifications.

Figure 5:
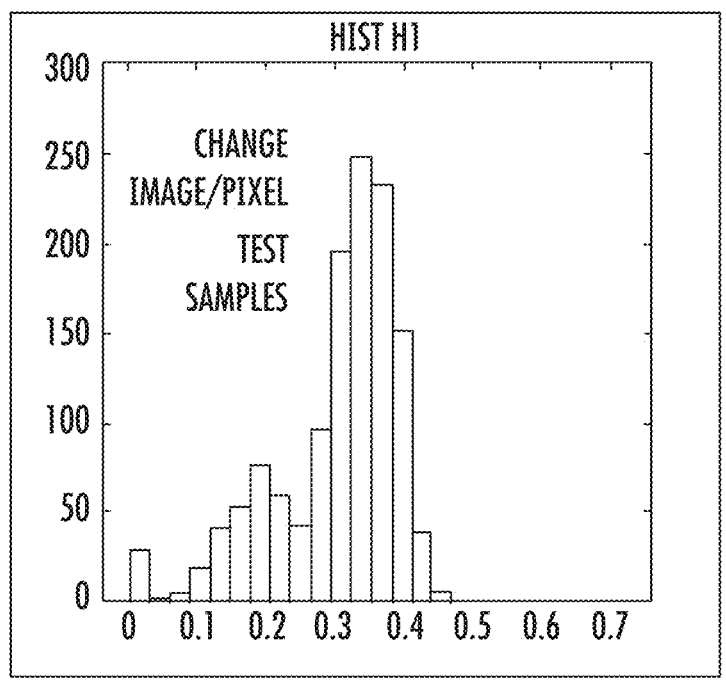
FIG. 5 is a graph of H1, change image/pixel test samples, in accordance with an embodiment of the invention.

More specifically, the Z test is used to determine if the new signal distribution belongs to any existing distributions. All distributions are looped through, and the highest p value for each Z test is kept. A high p value means that the new distribution is already in the training data. Then, 1 is subtracted from these scores for H0 (FIG. 4) and H1 (FIG. 5). The results are the ROC curves of FIG. 3.

Figure 6:
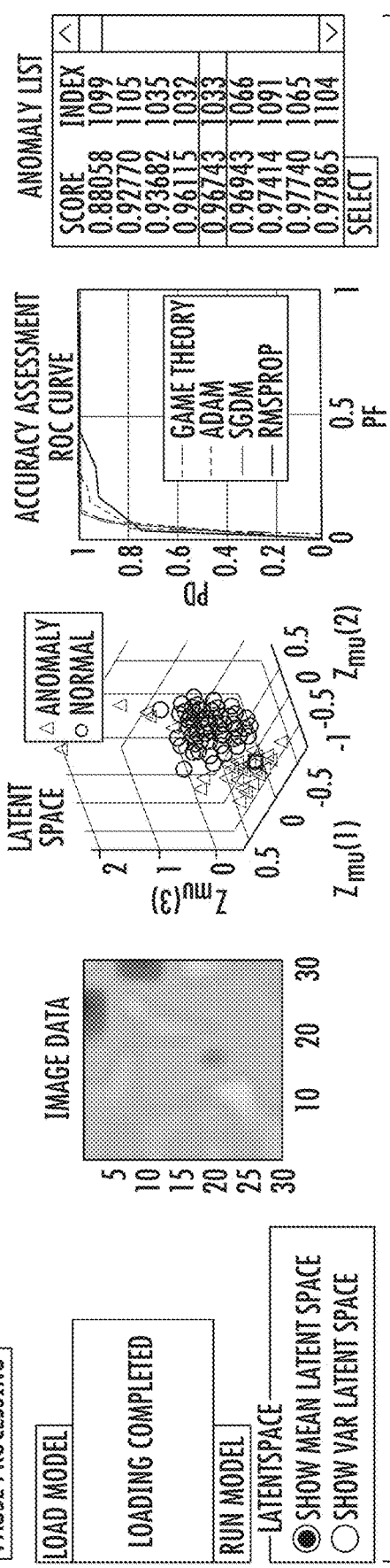
FIG. 6 is an exemplary visualization tool for use by a data analyst in accordance with an embodiment of the invention.

The system also either determines or enables a user to determine whether selected data for test is anomalous or not. Several visualization tools are provided. One such tool is shown in FIG. 6 and is especially pertinent to data communication anomaly detection. The 7×7 array of data fields are the dimensions of the data being read from CSV files, Kafka streams, or the like as part of Extract, Transform, and Load (ETL) processing and represent the different variables of the data set (the variables can be changed from project to project). The tool in FIG. 6 gets data from CSV files extracted from Data Comm's Data Catalog Vocabulary v2 (DCAT II) system. The file has 84 columns; 49 of them are selected here to use for anomaly detection. The types of data being reviewed in this case, in which the system in question concerns air traffic control, include the following, as shown below in Table 1:

TABLE 1

| Label | Description |
| --- | --- |
| 1. tail | Tail # of an aircraft |
| 2. direction | Uplink or Downlink. Direction of the message. |
| 3. destination | Destination Address of where to send the message to |
| 4. signature | Message Originator address (Message came from X(Signature)). |
| 5. timeStamp | Time Stamp Date and Time HH:MM:SS.ms |
| 6. smi | smi = Standard Message Identifier |
| 7. priority | Priority à Priority of Message (or Message priority values). Per A620 - There is only one priority code in use, thus all messages are encoded with the characters QU. |
| 8. msgType | Type of message being |
| 9. fidicao | Flight ID ICAO (ICAO ID Code). ICAO = International Civil Aviation Organization. |
| 10. flidata | Flight ID IATA (IATA Flight ID Code). IATA = International Air Transport Association. |
| 11. csp | csp = Communications Service Provider |
| 12. gs | gs = # representing a Ground Station |
| 13. media | Type of media communicated on |
| 14. operator | # representing the company operating the aircraft, such as American Airlines, Delta, Southwest, United, etc. |
| 15. session | # for the communication session |
| 16. airframe | # representing the structure of the aircraft, such as B747, B757 or A310 |

TABLE 1-continued

| Label | Description |
|---|---|
| 17. acModel | # representing the basic model of the aircraft, such as 737, 747, 757, or 310 |
| 18. acSeries | # representing the series of an aircraft model, such as 737-700, 737-800, or 737- MAX 8 |
| 19. acVdr | # representing the aircraft vendor (manufacturer), such as Boeing, Airbus, Embraer |
| 20. prevMsgType | Previous Message Type (What the previous message type was) |
| 21. prevLat | Previous Latitude position |
| 22. prevLng | Previous Longitude position |
| 23. prevAlt | Previous Altitude |
| 24. nextLat | Next Latitude position |
| 25. nextLng | Next Longitude position |
| 26. nextAlt | Next Altitude |
| 27. lat | Current Latitude |
| 28. lng | Current Longitude |
| 29. alt | Current Altitude |
| 30. rocFtMin | A Rate of Climb in Feet per Minute |
| 31. isNormal | 0000 values - if it was normal |
| 32. adsType | Type of ADS message |
| 33. modifiedGs | Modified Ground Station - Estimated ground station |
| 34. gsLat | Ground station Latitude |
| 35. gsLng | Ground station Longitude |
| 36. gsElev | Ground station Elevation. |
| 37. prevMedia | The previous media used for the last transaction. |
| 38. mediaSwitch | True/False. Did the Media type change from the previous transaction and the current transaction? |
| 39. prevGs | Previous ground station |
| 40. prevGsLat | Previous ground station Latitude |
| 41. prevGsLng | Previous ground station Longitude |
| 42. handoff | True/False. Is the current ground station different than the previous ground station when this uplink occurred? |
| 43. flightPhase | Climb, Cruise, Decent, Landing/Ground, these are the phases of flight the aircraft is in |
| 44. prevGsRng | Previous Ground Station Range - Distance in nautical miles of the last known ground station |
| 45. currentGS | Current Ground Station |
| 46. insidePrevGs | At the time of the uplink message is the plane inside the Previous Ground Station Coverage Model |
| 47. insideCurrentGs | At the time of the uplink message is the plane inside the Current Ground Station Coverage Model |
| 48. arrival | Airport the plane arrived at |
| 49. departure | Airport the plane/flight departed from |

This visualization tool enables the user to select a test sample and show its location in the latent 3-D scatter plot (bottom right). This allows the user to analyze the characteristics of system performance. Additionally, one of the data fields, in this case "isNormal", is highlighted as potentially out of the ordinary range, thereby getting the attention of the analyst.

Other visualization tools can enable the user to select a data sample and see where that sample is located in the latent space 3-D point scatter plot. Other visualizations are possible, from the complex to a simple blinking light to alert the analyst that something is amiss. The system itself can have anomaly thresholds pre-set and settable to self-determine whether an event rises to the level of an incident requiring a response.

In an embodiment, the neural network architecture is as follows. In the encoder layer:

```
encoderLG = layerGraph([
    imageInputLayer(imageSize,'Name','input_encoder','Normalization','none')
    convolution2dLayer(3,4,'Padding','same','Name','conv_1')
    batchNormalizationLayer('Name','BN_1')
    reluLayer('Name','relu_1')
    maxPooling2dLayer(1,'Stride',1, 'Name','max1')
    convolution2dLayer(3,8,'Padding','same','Stride',2, 'Name','conv_2')
    batchNormalizationLayer('Name','BN_2')
    reluLayer('Name','relu_2')
    maxPooling2dLayer(1,'Stride', 1, 'Name','max2')
    convolution2dLayer(3,16,'Padding','same','Stride',2,'Name','conv_3')
    batchNormalizationLayer('Name','BN_3')
    reluLayer('Name','relu_3')
    maxPooling2dLayer(1,'Stride', 1, 'Name','max3')
    convolution2dLayer(3,32,'Padding','same','Stride',2,'Name','conv_4')
    batchNormalizationLayer('Name','BN_4')
    reluLayer('Name','relu_4')
    maxPooling2dLayer(1,'Stride', 1, 'Name','max4')
    convolution2dLayer(3,64,'Padding','same','Stride',2,'Name','conv_5')
    batchNormalizationLayer('Name','BN_5')
```

-continued

- reluLayer('Name','relu_5')
- maxPooling2dLayer(1,'Stride', 1, 'Name','max5')
- convolution2dLayer(3,128,'Padding','same','Stride',2,'Name','conv_6')
- batchNormalizationLayer('Name','BN_6')
- reluLayer('Name','relu_6')
- fullyConnectedLayer(2*latentDim,'Name','fc')]);

In the decoder layer:

```
decoderLG = layerGraph([
    imageInputLayer([1 1
latentDim],'Name','i','Normalization','none')
    transposedConv2dLayer(8, 64, 'Cropping', 'same', 'Stride', 8,
'Name', 'transpose1')
    reluLayer('Name','relu1')
    transposedConv2dLayer(3, 32, 'Cropping', 'same', 'Stride', 2,
'Name', 'transpose2')
    reluLayer('Name','relu2')
    transposedConv2dLayer(3, 16, 'Cropping', 'same', 'Stride', 2,
'Name', 'transpose3')
    reluLayer('Name','relu3')
    transposedConv2dLayer(3, 8, 'Cropping', 'same', 'Stride', 2,
'Name', 'transposed')
    reluLayer('Name','relu4')
    transposedConv2dLayer(3, 1, 'Cropping', 'same', 'Stride', 2,
'Name', 'transpose7')
    ]);
```

Figure 7:
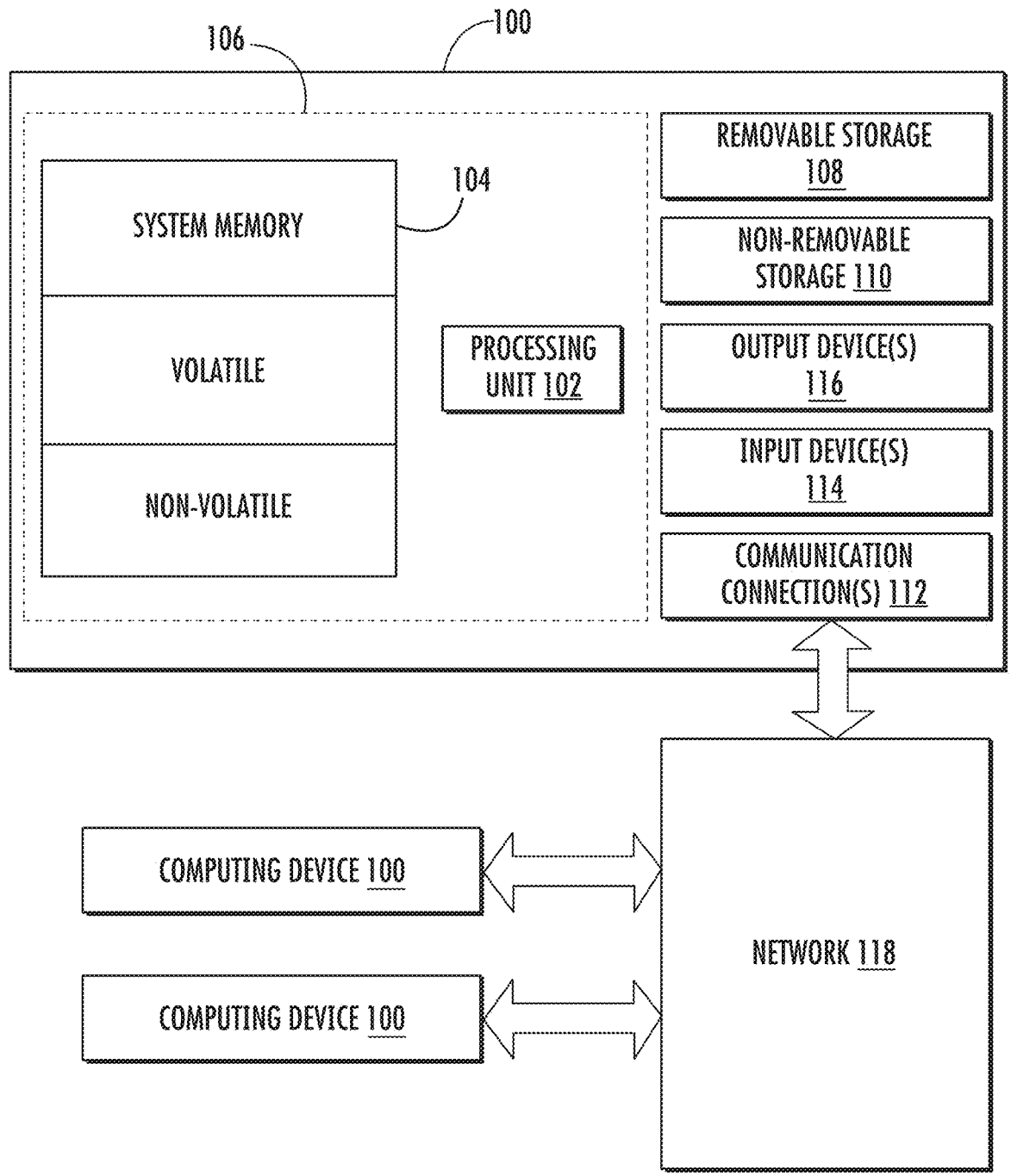
FIG. 7 is a block diagram of an exemplary computing environment within which various embodiments of the invention may be implemented and upon which various embodiments of the invention may be employed.
Figure 8A:
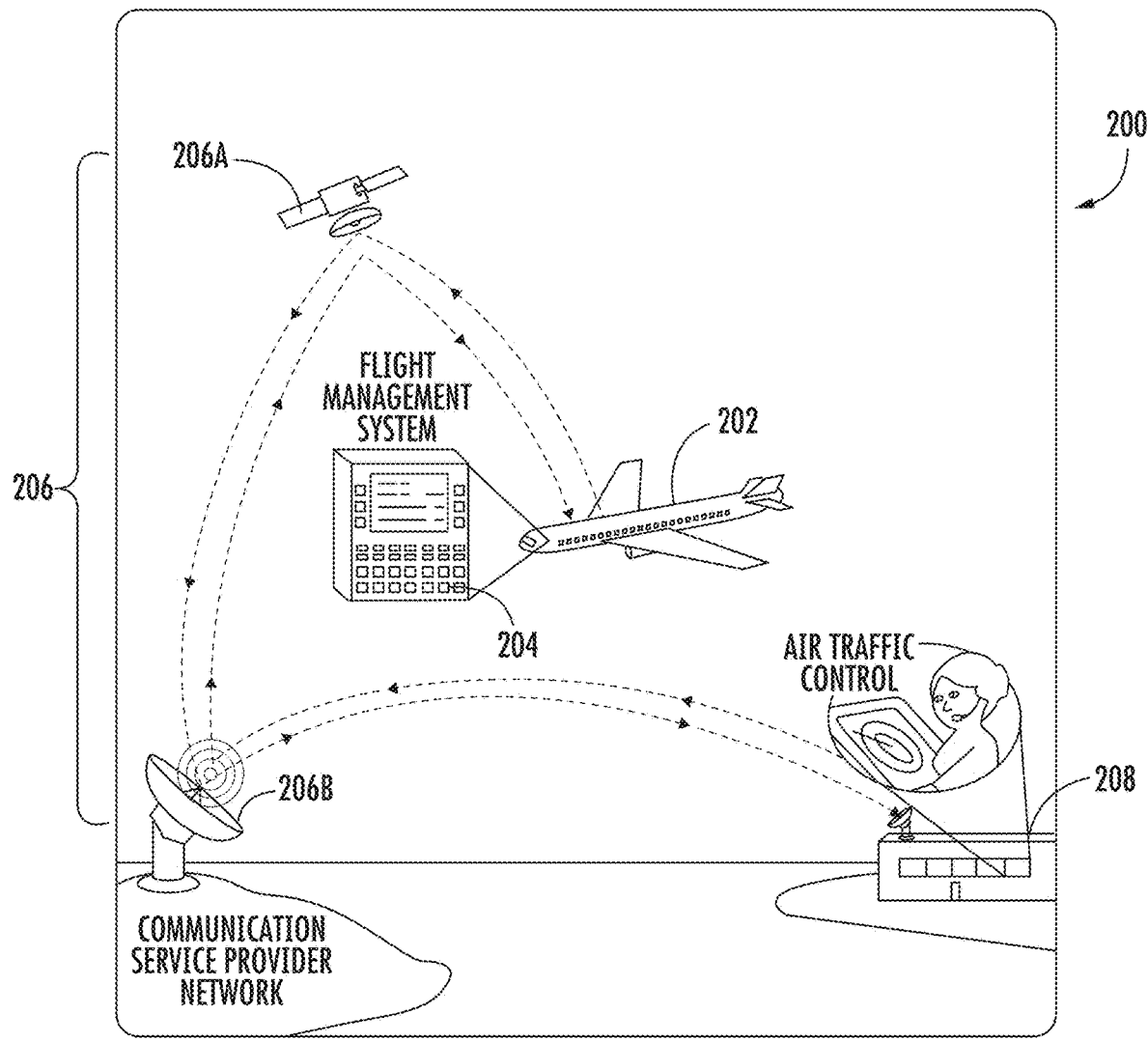
FIG. 8A is a schematic of an aviation data communication system with which the invention can be employed, specifically ADS-C.
Figure 8B:
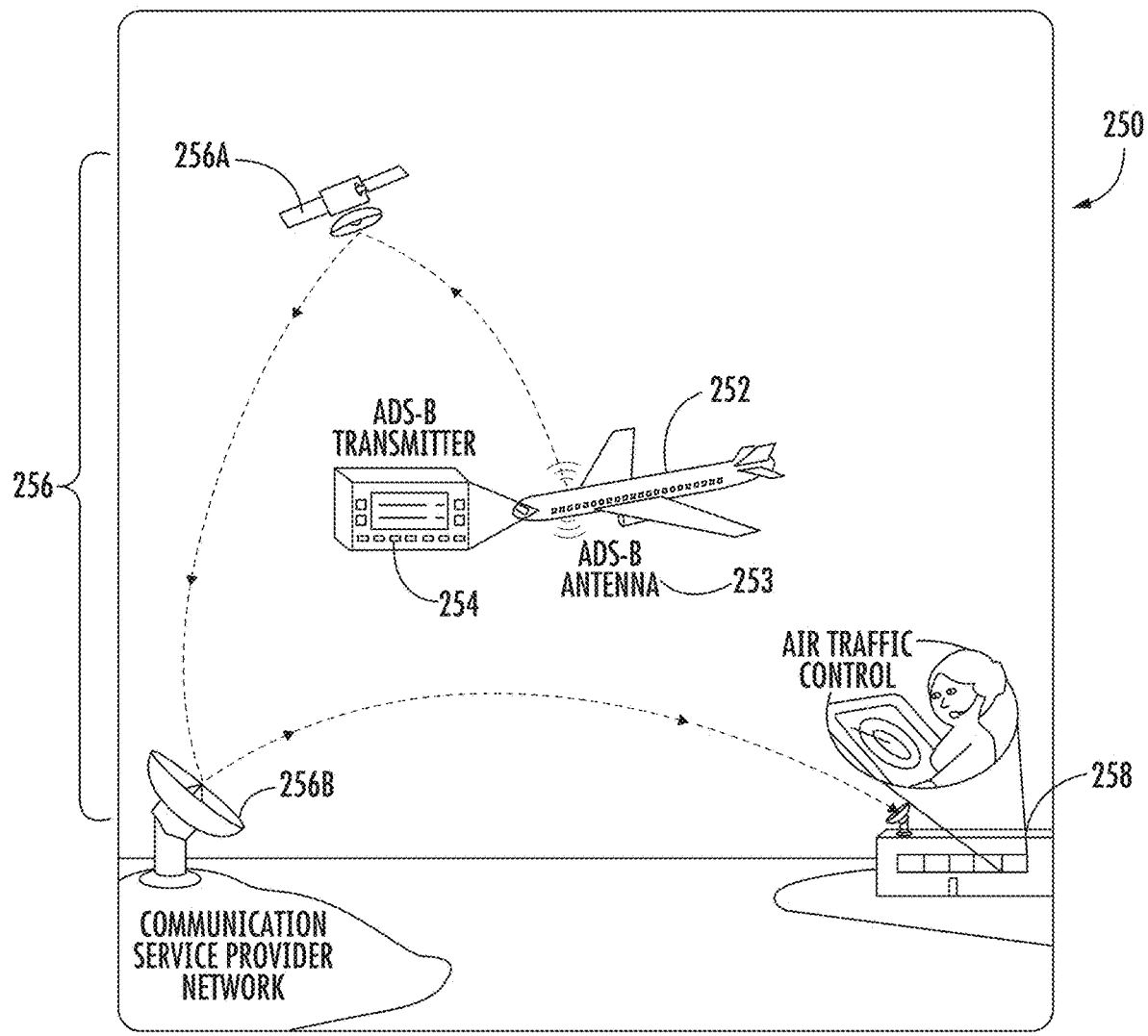
FIG. 8B is a schematic of an aviation data communication system with which the invention can be employed, specifically ADS-B.

FIG. 7 depicts an exemplary computing environment in which various embodiments of the invention may be implemented and upon which various embodiments of the invention may be employed. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal electronic devices such as smart phones and smart watches, tablet computers, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 7 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 7 by removable storage 108 and non-removable storage 110. Computing device 100 as used herein may be either a physical hardware device, a virtual device, or a combination thereof.

Computing device 100 typically includes or is provided with a variety of computer-readable media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known and therefore need not be discussed in any detail herein except as provided.

Notably, computing device 100 may be one of a plurality of computing devices 100 interconnected by a network 118, as is shown in FIG. 7. As may be appreciated, the network 118 may be any appropriate network; each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as USB flash drives, SD cards, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations. In an embodiment, the system can be developed using MATLAB of MathWorks, in particular MATLAB version 2020b.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

In exemplary operation, the invention works as follows. An ATC surveillance system such as ADS-C or ADS-B is being monitored for aircraft location errors, bearing errors, potential aircraft collisions, any parameter that is running out of the ordinary range, weak signals (Signal to Noise Ratio (SNR)), line of sight, obstructions, etc. In an embodiment, the aircraft sends data to a satellite; the satellite sends the data down to an ADS-CB gateway on the surface. ADS-CB data is monitored by Data Comm's DCAT II system. The DCAT II system receives ADS-CB data via a Future Air Navigation System (FANS) gateway.

The information about link monitoring (data quality) and signal to noise ratio is recorded in logs that are used to monitor the data. Anything outside the norm of the operational parameters would indicate an anomaly within the system. Activity within the system is reported (from multiple data streams) that would be detected by the network and captured by an event log such as system/event logs and the like. The following list indicates some of the activity that may be detected, but this list does not encompass all activity which may be detected:

Denial of Service Attack—Occurs at the Radio Frequency (RF) using jamming techniques to make resources less available. Also characterized as high packets per second rate. Makes resources less available due to excessive authentication and requests to the server/appliance;

Brute Force—Overwhelming System events using event generators at the RF equipment. Also someone or something may be trying to log into a system repeatedly with high number of attempts. This would be indicative of someone trying to hit a server/appliance with various usernames and passwords that try to gain access;

Unknown IP/MAC Address—Characterized as spoofing IP Addresses. Unknown IP and or MAC Address that the system has not seen before would indicate an attack or threat;

Data Deviation—Any deviation from data (anomalies in data). Any deviation from the baseline traffic would indicate an alert and flag the data as suspicious;

Bandwidth—Overutilization for prolonged period of time. Excessive data transmit/receive may indicate a large portion of bandwidth being used, which may indicate an attack or threat;

Data Exfiltration—Data leakage is identified by the loss of data, e.g., packet loss. One can then mitigate the risk using the invention. Observing excessive outbound traffic or a spike in traffic at unusual times which is inconsistent with history (previous network patterns).

The system is being monitored by tools used to collect telemetry data concerning, e.g., system/event log data from network devices such as servers, routers, switches, and the like, suspicious IP addresses, device failure, a number of servers being part of a botnet or have malware installed, or any device exhibiting a different or out of the ordinary type of behavior. The data can be batch or steaming. Examples of streaming data would be Kafka, AWS Kinesis Firehose, ActiveMQ, Solace, or the like.

In any case, a state of the system, or a subset of the system (a cluster of devices, a single device, etc.) generates device status information that is sent to the processor running the inventive VAE. The device status information is preprocessed via an image gradient sobel edge detector, and then fed to the encoder of the VAE. The encoder takes the preprocessed data and converts it into a 20-dimensional Gaussian distribution with hidden vectors for mean and variance in the latent space. The top three dimensions are selected, and the visualization of the data is now a 3-dimensional data point in the latent space. That data point is compared to an existing previously learned scatter plot of non-anomalous conditions that had been fed through the VAE to populate the latent space. Alternatively, the data point in question is compared to an existing previously learned scatter plot of anomalous conditions that had been fed through the VAE. The further away the data point in question is from the non-anomalous plot, the more likely the data point represents an anomaly requiring attention. This is especially useful in edge cases, i.e., data points that lie on the edge of the anomalous/non-anomalous border, e.g., the highlighted data point being identified in latent space in FIG. 6 on the border of the normal and anomaly regions. Coming into the VAE and exiting the VAE, the data is optimized via a game theory implementation of three solvers; the solver with the least error is chosen for each quantum of data.

The following are some of the key areas where the invention can help in such fields as the telecom industry and aviation. It integrates, fuses, and correlates millions of network, telemetry, and service events per day from various disparate sources. It leverages AI and ML to anticipate events proactively that may cause issues within the network. It automates the trouble ticketing process by identifying root causes and recommending the next best action within minutes, reducing mean time to detect (MTTD) and mean time to repair (MTTR). It integrates multiple sources of security analytics and identifies the risks in the system. It creates personalized dashboards for network and security engineers so that they can have up to date situational awareness for decision making. Its built-in ML algorithms help reduce time to detect and resolve incidents that do occur, thus improving quality of service and reducing the overall cost of addressing downtimes and outages. Additionally, the invention can help telecom operators find areas of efficiencies and synergies where it can translate into savings and opportunities to the customer. Additionally, the invention can enhance resiliency and responsiveness of the overall Air Traffic Management system and underlaying infrastructure through predicting network behavior with deeper insight.

The invention is not limited to the above description. For example, while ADS-C and ADS-B are highlighted, the invention is applicable to any aviation data communication system, including radar, the Air Traffic Control Radar Beacon System (secondary surveillance radar), surveillance radar, Precision Approach Radar, Airport Surface Detection Equipment/Airport Surface Surveillance Capability, the Traffic Information Service, Traffic Information Service-Broadcast, Flight Information Service-Broadcast, Automatic Dependent Surveillance-Rebroadcast, and the like.

Additionally, the invention is not limited to telco operators or air traffic control infrastructure. It has much broader applications across an array of industries and for a variety of purposes, including IT and DevOps, manufacturing, healthcare, fintech, and in the public sector. For example, enterprise cloud providers can leverage this solution to increase visibility into their infrastructure, providing valuable insights so that they can take proactive actions. This helps with simplified operations, faster service delivery, and improved experience for end customers. The economic benefits include reduced operational expenses (OpEx), faster time to service, and significant savings in total cost of ownership (TCO).

Having described certain embodiments of the invention, it should be understood that the invention is not limited to the above description or the attached exemplary drawings. Rather, the scope of the invention is defined by the claims appearing hereinbelow and includes any equivalents thereof as would be appreciated by one of ordinary skill in the art. For clarity, "at least one of A or B" means either A, or B, or both A and B.

What is claimed is:

1. An aviation data communication anomaly detection system, comprising:
   a plurality of interconnected aviation data communication devices, at least a portion of the plurality of the devices generating device status information; and
   a processor in communication with at least one of the devices of the portion of the plurality of the devices and receiving the device status information, the processor operating a variational autoencoder that receives the device status information;
   optimizes the received device status information; and
   determines or enables a user to determine whether the device status information qualifies as an anomaly that requires a response,
   wherein the processor compares the optimized device status information to at least one of non-anomalous device status data or anomalous device status data in a latent space of the variational autoencoder, and
   wherein the processor optimizes the device status information by generating a plurality of probabilistic models of the device status information and determining which of the plurality of models is optimal, and
   wherein the processor determines which of the plurality of models is optimal by applying a linear program game theoretic optimization to the plurality of models and selecting which of the plurality of models to use to generate the n-D point scatter plot in latent space, and
   wherein the plurality of models includes at least two of Adam, SGDM, or RMSProp.

2. An aviation data communication anomaly detection system according to claim 1, wherein the latent space comprises an n-D point scatter plot, and wherein the further the optimized device status information is from the non-anomalous device status data in the latent space, the greater the likelihood the device status information represents an anomaly.

3. An aviation data communication anomaly detection system according to claim 2, wherein the latent space comprises a 3-D point scatter plot that includes hidden vector values.

4. An aviation data communication anomaly detection system according to claim 2, further comprising:
   a display; and
   a user interface, the user interface enabling a user to select a data sample from the device status information and to see where the data sample is located in the latent space n-D point scatter plot.

5. An aviation data communication anomaly detection system according to claim 1, the processor further comprising an image gradient sobel edge detector that preprocesses the device status information prior to optimizing the device status information.

6. An aviation data communication anomaly detection system according to claim 5, wherein the image gradient sobel edge detector is configured to return a floating point edge metric.

7. An aviation data communication anomaly detection system according to claim 1, wherein the plurality of interconnected aviation data communication devices comprises an air traffic control surveillance system.

8. An aviation data communication anomaly detection system according to claim 1, wherein a decoder process of the variational autoencoder generates synthetic output data.

9. An aviation data communication anomaly detection system according to claim 1, wherein the processor utilizes a Z test to determine if a new signal distribution belongs to any existing distributions.

10. A method of detecting aviation data communication anomalies in a plurality of interconnected aviation data communication devices, the method comprising the steps of:
    generating device status information for at least a portion of the plurality of interconnected aviation data communication devices;
    receiving the device status information at a processor in communication with at least one of the devices of the portion of the plurality of devices;

operating a variational autoencoder on the processor that is configured for
receiving the device status information;
optimizing the received device status information; and
determining or enabling a user to determine whether the device status information qualifies as an anomaly that requires a response; and
comparing, via the processor, the optimized device status information to at least one of non-anomalous device status data or anomalous device status data in a latent space of the variational autoencoder,
wherein the optimizing step further comprises the steps of:
generating, via the processor, a plurality of probabilistic models of the device status information; and
determining, via the processor, which of the plurality of models is optimal, and
wherein the step of determining which of the plurality of models is optimal further comprises the steps of:
applying a linear program game theoretic optimization to the plurality of models; and
selecting which of the plurality of models to use to generate the n-D point scatter plot in latent space.

11. A method of detecting aviation data communication anomalies according to claim 10, wherein the latent space includes an n-D point scatter plot, and wherein the further the optimized device status information is from the non-anomalous device status data in the latent space, the greater the likelihood the device status information represents an anomaly.

12. A method of detecting aviation data communication anomalies according to claim 11, wherein the latent space includes a 3-D point scatter plot that includes hidden vector values.

13. A method of detecting aviation data communication anomalies according to claim 10, wherein the optimizing step is performed for at least one subset of the device status information.

14. A method of detecting aviation data communication anomalies according to claim 10, further comprising the step of preprocessing the device status information prior to optimizing the device status information via an image gradient sobel edge detector.

15. A method of detecting aviation data communication anomalies according to claim 14, further comprising the step of returning a floating point edge metric via the image gradient sobel edge detector.

16. A method of detecting aviation data communication anomalies according to claim 10, further comprising the steps of:
implementing a 3-D p-value statistical test to measure anomaly detection accuracy; and
representing the results of the 3-D p-value statistical test with ROC curves.

17. A method of detecting aviation data communication anomalies according to claim 16, the implementing step further comprising the steps of:
selecting a 3-D view of latent space clusters that shows the most separation of test hypotheses; and
calculating the probability of the most likely non-anomalous device status data to which received device status information might belong to latent space distribution.

18. A method of detecting aviation data communication anomalies according to claim 10, wherein the plurality of interconnected aviation data communication devices comprises an air traffic control surveillance system.

19. A method of detecting aviation data communication anomalies according to claim 10, further comprising the step of generating synthetic output data via a decoder process of the variational autoencoder.

20. A method of detecting aviation data communication anomalies according to claim 10, further comprising the step of utilizes a Z test to determine if a new signal distribution belongs to any existing distributions.

21. A non-transitory computer-readable storage medium, comprising one or more programs for executing a model of detecting aviation data communication anomalies in a plurality of interconnected aviation data communication devices by use of a variational autoencoder, wherein the model is configured to:
receive device status information from at least a portion of the plurality of interconnected aviation data communication devices;
optimize the received device status information by use of the variational autoencoder;
determine or enable a user to determine whether the device status information qualifies as an anomaly that requires a response;
compare, via a processor, the optimized device status information to at least one of non-anomalous device status data or anomalous device status data in a latent space of the variational autoencoder;
optimize, via the processor, the device status information by generating a plurality of probabilistic models of the device status information and determines which of the plurality of models is optimal;
determine, via the processor, which of the plurality of models is optimal by applying a linear program game theoretic optimization to the plurality of models and selecting which of the plurality of models to use to generate the n-D point scatter plot in latent space.

22. A non-transitory computer-readable storage medium according to claim 21, wherein the latent space includes an n-D point scatter plot, and wherein the further the optimized device status information is from the non-anomalous device status data in the latent space, the greater the likelihood the device status information represents an anomaly.

23. A non-transitory computer-readable storage medium according to claim 22, wherein the latent space includes a 3-D point scatter plot that includes hidden vector values.

24. A non-transitory computer-readable storage medium according to claim 21, wherein the model is further configured to preprocess the device status information prior to optimizing the device status information via an image gradient sobel edge detector.

25. A non-transitory computer-readable storage medium according to claim 24, wherein the model is further configured to return a floating point edge metric via the image gradient sobel edge detector.

26. A non-transitory computer-readable storage medium according to claim 21, wherein the model is further configured to:
implement a 3-D p-value statistical test to measure anomaly detection accuracy; and
represent the results of the 3-D p-value statistical test with ROC curves.

27. A non-transitory computer-readable storage medium according to claim 26, wherein the model is further configured to:
select a 3-D view of latent space clusters that shows the most separation of test hypotheses; and calculate the probability of the most likely non-anomalous device status data to which received device status information might belong to latent space distribution.

28. A non-transitory computer-readable storage medium according to claim 21, wherein the plurality of interconnected aviation data communication devices comprises an air traffic control surveillance system.

29. A non-transitory computer-readable storage medium according to claim 21, wherein the model is further configured to generate synthetic output data via a decoder process of the variational autoencoder, via the processor.

30. A non-transitory computer-readable storage medium according to claim 21, wherein the model is further configured to utilize a Z test to determine if a new signal distribution belongs to any existing distributions.

* * * * *